United States Patent
Thomsen et al.

(10) Patent No.: US 6,632,491 B1
(45) Date of Patent: Oct. 14, 2003

(54) IG WINDOW UNIT AND METHOD OF MAKING THE SAME

(75) Inventors: Scott V. Thomsen, Milford, MI (US); Ronald E. Laird, Dexter, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/151,705

(22) Filed: May 21, 2002

(51) Int. Cl.[7] .................. E06B 3/24; C03C 27/00; E04C 2/54
(52) U.S. Cl. .................. 428/34; 428/432; 428/434; 428/701; 428/702; 428/913.3; 156/109; 52/786.1; 52/786.13
(58) Field of Search .................. 428/34, 432, 434, 428/699, 701, 702, 913.3; 52/786.1, 786.13; 156/107, 109

(56) References Cited

U.S. PATENT DOCUMENTS

| | | | |
|---|---|---|---|
| 3,682,528 A | 8/1972 | Apfel et al. | |
| 4,853,264 A | 8/1989 | Vincent et al. | |
| 4,898,790 A | 2/1990 | Finley | |
| 4,965,121 A | 10/1990 | Young et al. | |
| 5,110,637 A | * 5/1992 | Ando et al. | 428/34 |
| 5,156,894 A | 10/1992 | Hood et al. | |
| 5,251,064 A | 10/1993 | Tennant et al. | |
| 5,306,547 A | 4/1994 | Hood et al. | |
| 5,308,662 A | 5/1994 | Woodard et al. | |
| 5,332,618 A | 7/1994 | Austin | |
| 5,371,138 A | 12/1994 | Schaefer et al. | |
| 5,510,173 A | 4/1996 | Pass et al. | |
| 5,514,476 A | 5/1996 | Hartig et al. | |
| 5,557,462 A | 9/1996 | Hartig et al. | |
| 5,563,734 A | 10/1996 | Wolfe et al. | |
| 5,784,853 A | 7/1998 | Hood et al. | |
| 5,800,933 A | 9/1998 | Hartig et al. | |
| 5,837,108 A | 11/1998 | Lingle et al. | |
| 5,840,161 A | 11/1998 | Woodard et al. | |
| 5,902,505 A | 5/1999 | Finley | |
| 5,935,702 A | 8/1999 | Macquart et al. | |
| 5,981,059 A | 11/1999 | Bright et al. | |
| 6,014,872 A | 1/2000 | Hartig et al. | |
| 6,030,671 A | 2/2000 | Yang et al. | |
| 6,132,881 A | * 10/2000 | Hartig et al. | 428/34 |
| 6,261,693 B1 | 7/2001 | Veerasamy | |
| 6,277,480 B1 | 8/2001 | Veerasamy et al. | |
| 6,280,834 B1 | 8/2001 | Veerasamy et al. | |
| 6,303,225 B1 | 10/2001 | Veerasamy | |
| 6,368,470 B1 | 4/2002 | Woodard | |

FOREIGN PATENT DOCUMENTS

| | | |
|---|---|---|
| WO | WO 01/66482 | 9/2001 |
| WO | WO 01/66483 | 9/2001 |
| WO | WO 02/04375 | 1/2002 |

OTHER PUBLICATIONS

U.S. patent application Ser. No. 09/978,184, filed Oct. 17, 2001 (copy attached).

* cited by examiner

Primary Examiner—Donald J. Loney
(74) Attorney, Agent, or Firm—Nixon & Vanderhye P.C.

(57) ABSTRACT

An insulating glass (IG) window unit, and/or a method of making the same is/are provided. The IG window unit includes two spaced apart substrates that are separated from one another by at least one seal and/or spacer, wherein a first one of the substrates supports a solar management coating for blocking significant amounts of infrared (IR) radiation and the other one of the substrates supports a coating for blocking amounts of ultraviolet (UV) radiation.

30 Claims, 5 Drawing Sheets

IG WINDOW UNIT AND METHOD OF MAKING THE SAME

This invention relates to an insulating glass (IG) window unit, and/or a method of making the same. In certain embodiments, the IG window unit includes first and second substrates (e.g., glass substrates) spaced apart from one another, wherein the first substrate supports a solar management coating for blocking at least some infrared (IR) radiation and the second substrate supports an ultraviolet (UV) radiation blocking coating for blocking at least some UV radiation.

BACKGROUND OF THE INVENTION

IG window units are known in the art. For example, see U.S. Pat. Nos. 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances.

Many conventional IG window units include a solar management coating (e.g., multi-layer coating for reflecting at least some infrared radiation) on an interior surface of one of the two substrates. While such IG units enable significant amounts of infrared (IR) radiation to be blocked so that it does not reach the interior of the building (apartment, house, office building, or the like), they are typically lacking in terms of blocking UV radiation. In other words, the solar management coatings provided on IG units while capable of blocking satisfactory amounts of IR radiation are often not capable of blocking as much UV radiation as would be desired.

In view of the above, it can be seen that there exists a need in the art for an IG window unit that is capable of blocking both (a) significant amounts of IR radiation, and (b) significant amounts of UV radiation, so that the blocked amounts of IR and UV radiation do not reach the interior of the building in which the IG window unit is mounted. In certain embodiments, there may also exist a need in the art for a method of making such an IG window unit.

BRIEF SUMMARY OF THE INVENTION

An object of certain example embodiments of this invention is to provide an IG window unit capable of blocking both (a) significant amounts of IR radiation, and (b) significant amounts of UV radiation, so that the blocked amounts of IR and UV radiation do not reach the interior of the building in which the IG window unit is provided.

Another object of certain example embodiments of this invention is to provide a window unit including two spaced apart substrates (glass, plastic, or the like) that are separated from one another by at least one seal and/or spacer, wherein a first one of the substrates supports a solar management coating for blocking significant amounts of IR radiation and the other one of the substrates supports a coating for blocking significant amounts of UV radiation.

Another object of certain embodiments of this invention is to fulfill one or more of the above-listed objects and/or needs.

Certain example embodiments of this invention fulfill one or more of the above-listed objects and/or needs by providing an IG window unit comprising: a first glass substrate supporting a solar management multi-layer coating; a second glass substrate spaced apart from the first glass substrate, the second glass substrate supporting a UV blocking coating including at least one layer; wherein the solar management coating supported by the first glass substrate comprises first and second IR blocking layers each comprising Ag, at least one dielectric layer provided between the first IR blocking layer and the first substrate, at least another dielectric layer provided between the first and second IR blocking layers, and wherein the solar management coating supported by the first substrate has an emissivity ($E_n$) of no greater than 0.10 and/or a sheet resistance ($R_s$) of no greater than 8 ohms/square; wherein the UV blocking coating supported by the second substrate blocks (e.g., reflects and/or absorbs) at least 50% of UV radiation from 300 to 380 nm; and wherein the IG window unit has a visible transmission of at least about 60%, and blocks at least about 80% of UV radiation from 300–380 nm.

Other example embodiments of this invention fulfill one or more of the above-listed needs by providing a window unit comprising: a first substrate supporting a solar management coating; a second substrate spaced apart from the first substrate, the second glass substrate supporting a UV blocking coating; wherein the solar management coating supported by the first substrate comprises at least one IR blocking layer, at least one dielectric layer provided between the IR blocking layer and the first substrate, at least another dielectric layer provided over the IR blocking layer; and wherein the window unit has a visible transmission of at least about 60%, and blocks at least about 80% of UV radiation from 300–380 nm.

Still other embodiments of this invention fulfill one or more of the above-listed objects and/or needs by providing window unit comprising: a first substrate supporting a coating; a second substrate spaced apart from the first substrate, the second glass substrate supporting a UV blocking coating; wherein the coating supported by the first substrate has an emissivity ($E_n$) of no greater than 0.20 and/or a sheet resistance ($R_s$) of no greater than 20 ohms/square; and wherein the window unit has a visible transmission of at least about 60%, and blocks at least about 80% of UV radiation from 300–380 nm.

Yet other embodiments of this invention fulfill one or more of the above-listed objects and/or needs by providing a method of making a window unit, the method comprising: depositing a solar management coating on a first substrate, the solar management coating comprising at least one layer for blocking amounts of IR radiation; forming a UV blocking coating that blocks at least some UV radiation on a second substrate; and coupling the first and second substrates to one another so that the respective coatings face each other across a gap provided between the substrates, and wherein the window unit has a visible transmission of at least 60% and blocks at least about 80% of UV radiation from 300–380 nm.

DETAILED DESCRIPTION OF EXAMPLE EMBODIMENTS OF THE INVENTION

Referring now more particularly to the accompanying drawings in which like reference numerals indicate like parts throughout the several views.

Certain example embodiments of this invention relate to an IG window unit including at least first and second spaced apart substrates (e.g., glass or plastic substrates having at least some visible transmission) that are separated from one another by at least one seal and/or spacer. The first substrate supports a solar management coating for blocking at least some infrared (IR) radiation and the second substrate supports a UV blocking coating for blocking at least some ultraviolet (UV) radiation. With regard to how much IR and UV radiation is blocked, in certain example embodiments of this invention the solar management coating may have an emissivity ($E_n$) of no greater than 0.10 and/or a sheet resistance ($R_s$) of no greater than 8 ohms/square, whereas the UV blocking coating may block at least 50% of UV radiation from 300 to 380 nm.

Figure 1:
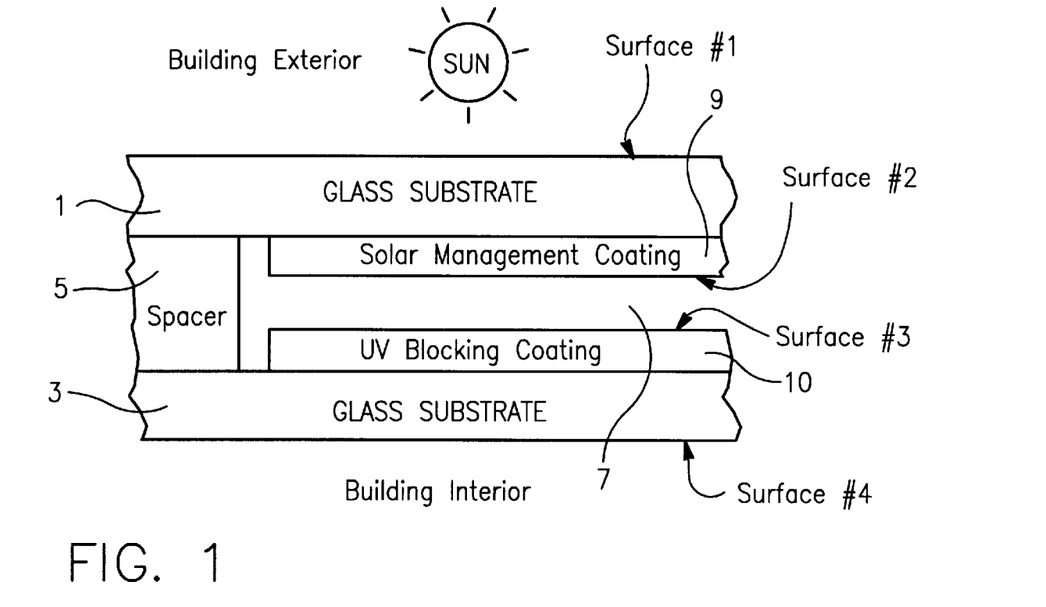
FIG. 1 is a cross sectional view of part of an IG window unit according to an example embodiment of this invention.

FIG. 1 is a cross sectional view of a portion of an IG window unit according to an example embodiment of this invention. As shown in FIG. 1, the IG window unit includes first substrate 1 and second substrate 3 that are spaced apart from one another at least by one or more peripheral seal(s) or spacer(s) 5. Optionally, an array of spacers (not shown) may be provided between the substrates in a viewing area of the window for spacing the substrates from one another as in the context of a vacuum IG window unit. The spacer(s) 5, other spacer(s), and/or peripheral seal space the two substrates 1 and 3 apart from one another so that the substrates do not contact one another and so that a space or gap 7 is defined therebetween. The space 7 between the substrates 1, 3 may be evacuated to a pressure lower than atmospheric in certain example embodiments, and/or may be filled with a gas (e.g., Ar) in certain example embodiments. Alternatively, space 7 between the substrates 1, 3 need not be filled with a gas and/or need not be evacuated to a low pressure. In certain example embodiments, it is possible to suspend foil or other radiation reflective sheet(s) (not shown) in space 7. When substrate(s) 1 and/or 3 are of glass, each glass substrate may be of the soda-lime-silica type of glass, or any other suitable type of glass, and may be for example from about 1 to 10 mm thick in certain example embodiments of this invention.

The IG window unit of FIG. 1 includes a solar management coating 9 that is supported by substrate 1. Solar management coating 9 includes one or more layers, although in many embodiments it is a multi-layer coating. Since one example function of solar management coating 9 is to block (i.e., reflect and/or absorb) certain amounts of IR radiation and prevent the same from reaching the building (or vehicle) interior, the solar management coating 9 includes at least one IR blocking (i.e., IR reflecting and/or absorbing) layer.

Example IR blocking layer(s) which may be present in coating 9 are of or include silver (Ag), nickel-chrome (NiCr), gold (Au), and/or any other suitable material that blocks significant amounts of IR radiation. It will be appreciated by those skilled in the art that IR blocking layer(s) of solar management coating 9 need not block all IR radiation, but only need to block significant amounts thereof. In certain embodiments, each IR blocking layer is provided between at least a pair of dielectric layers. Example dielectric layers include silicon nitride, titanium oxide, silicon oxynitride, tin oxide, and/or other types of metal-oxides and/or metal-nitrides. In certain embodiments, in addition to being between a pair of dielectric layers, each IR blocking layer may also be provided between a pair of contact layers of or including a material such as an oxide and/or nitride of nickel-chrome or any other suitable material. Example solar management coatings 9 which may be provided on substrate 1 are illustrated in FIGS. 3–6, and are more fully discussed below. Of course, solar management coatings 9 herein are not limited to the illustrated coatings, and any other suitable solar management coating capable of blocking amounts of IR radiation may instead be used. Solar management coatings 9 herein may be deposited on substrate(s) 1 and/or 3 in any suitable manner, including but not limited to sputtering, vapor deposition, and/or any other suitable technique.

Still referring to FIG. 1, the IG window unit further includes UV blocking coating 10 for blocking significant amounts of UV radiation. UV blocking coating 10 may be, for purposes of example and without limitation, any suitable commercially available UV blocking coating such as a UV blocking coating available from Guardian Industries, Corp., Auburn Hills, Michigan, or a silica based UV blocking coating available from Tru-Vue, Inc., Chicago, Ill. UV blocking coating 10 includes at least one layer, and blocks at least some UV radiation. For example and without limitation, any of the coatings described and/or illustrated in any of U.S. Pat. Nos. 5,332,618 or 5,371,138 (both incorporated herein by reference) may also be used as a UV blocking coating 10 in certain embodiments of this invention. In certain example embodiments of this invention, UV blocking coating 10 prevents at least about 50% of UV radiation (300–380 nm) reaching the same from passing therethrough, more preferably at least about 70%, even more preferably prevents at least about 80% of UV radiation reaching the same from passing therethrough, and most preferably prevents at least about 90% of UV radiation reaching the same from passing therethrough. In other words, UV blocking coating 10 preferably blocks at least about 50% of UV radiation (i.e., from 300–380 nm), more preferably at least about 70% of UV radiation, even more preferably at least about 80%, and most preferably at least about 90% of UV radiation. UV blocking coating 10 may block UV radiation (from 300–380 nm) by, for example and without limitation, reflecting such UV radiation, absorbing such UV radiation, and/or converting amounts of such UV radiation into other type(s) of radiation (e.g., IR), and/or the like. It is noted that coating 10 is not limited to the precise coatings described above, as any suitable UV blocking coating may be used as coating 10 in different embodiments of this invention. UV blocking coatings 10 according to different embodiments of this invention may be formed in any suitable manner (e.g., via sputter coating, via vapor deposition, via capillary action, via roll(s) coating, and/or the like).

As shown in FIG. 1, IG units typically are characterized as having four surfaces. In particular, surface #1 faces the building exterior, surface #2 is the interior coated/uncoated surface of the same substrate but faces the interior space/gap 7 of the IG unit, surface #3 is the interior coated/uncoated surface of the other substrate facing the interior space/gap 7, and surface #4 faces the building interior. In the FIG. 1 embodiment, solar management coating 9 is provided on surface #2 and UV blocking coating 10 is provided on surface #3. This is a preferred arrangement of the coatings, as it enables much IR radiation to be blocked before reaching space 7 and/or coating 10. However, in alternative embodiments of this invention, the positions of coatings 9 and 10 may be reversed, or they may be provided on different surfaces in still further embodiments of this invention.

Figure 2:
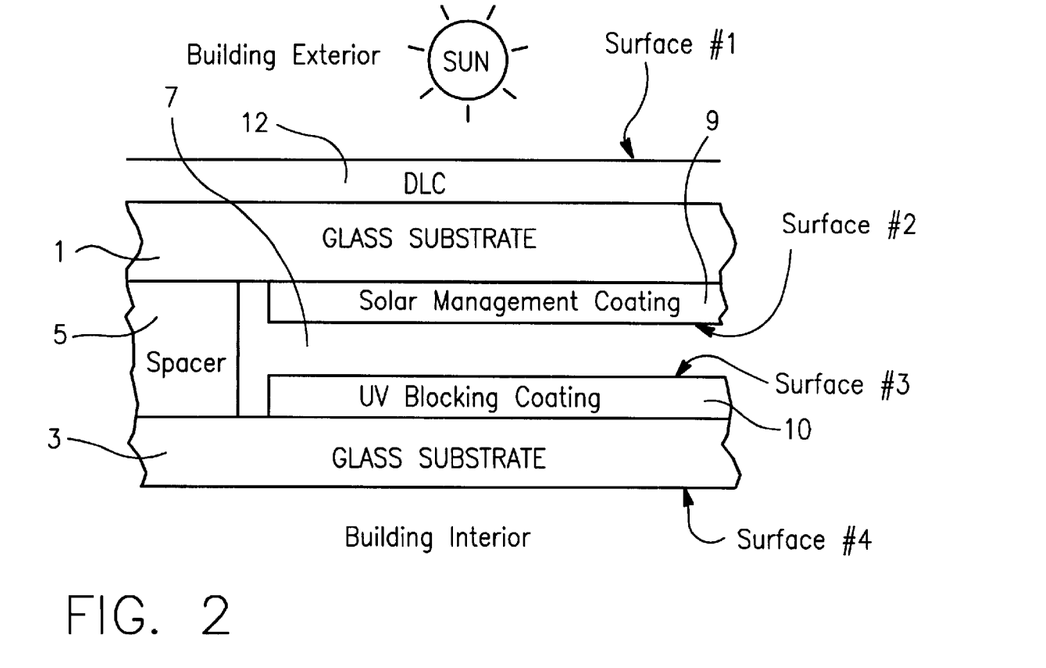
FIG. 2 is a cross sectional view of part of an IG window unit according to another example embodiment of this invention.

FIG. 2 is a cross sectional view of a portion of an IG window unit according to a different embodiment of this invention. The FIG. 2 embodiment is the same as the FIG. 1 embodiment, except that a diamond-like carbon (DLC) layer(s) 12 is provided on surface #1. In other words, substrate 1 supports solar management coating 9 on one major surface thereof and also supports DLC layer(s) 12 on the other (i.e., opposite) major surface thereof. DLC layer(s) 12 is of or includes diamond-like-carbon (DLC), and may include one or more layers.

DLC layer(s) 12 is preferably partially or entirely amorphous in certain embodiments of this invention. Moreover, DLC layer(s) 12 preferably includes more $sp^3$ carbon-carbon bonds than $sp^2$ carbon-carbon bonds. In certain example embodiments, at least 50% of the carbon-carbon bonds in DLC layer(s) 12 are of the $sp^3$ type, more preferably at least about 60% of the carbon-carbon bonds in DLC layer(s) 12 are of the $sp^3$ type, and most preferably at least about 70% of the carbon-carbon bonds in DLC layer(s) 12 are of the $sp^3$ type. In certain example embodiments, the DLC layer(s) 12 has an average density of at least about 2.4 $gm/cm^3$, more preferably of at least about 2.7 $gm/cm^3$, and/or may have an average hardness of at least about 10 GPa (more preferably of at least about 20 GPa, and most preferably of at least about 30 GPa). In certain example embodiments, DLC layer(s) 12 may include other materials such as hydrogen, boron, silicon, oxygen, and/or the like. For example, DLC layer(s) 12 may include from about 5–25% hydrogen (H) in certain embodiments, more preferably from about 10–20% H. DLC layer(s) 12 may be hydrophobic (high contact angle), hydrophilic (low contact angle), or neither in different embodiments of this invention. For purposes of example only, DLC layer(s) 12 may be of or include any of the DLC inclusive layer(s) or coating systems described in any of U.S. Pat. Nos. 6,261,693, 6,277,480, 6,280,834, 6,303,225, and/or 6,284,377 (all of which are hereby incorporated herein by reference) in different embodiments of this invention. DLC layer(s) 12 may be deposited on the substrate 1 via an ion beam deposition technique, or any other suitable deposition process (e.g., see the processes described in the aforesaid patents, incorporated herein by reference).

In alternative embodiments of this invention, DLC layer(s) 12 may instead, or in addition, be provided on surface #4 (i.e., on substrate 3) in a similar manner. In still further embodiments, it is possible to provide a DLC layer(s) 12 as a protective overcoat on one or both of coatings 9 and/or 10.

In view of the presence of both IR blocking coating (i.e., solar management coating) 9 and UV blocking coating 10, IG window units according to certain example embodiments of this invention as shown in FIGS. 1–2 may have the following solar characteristics (e.g., where the coated glass substrate 1 is a clear soda lime silica glass substrate from 2 to 3.2 mm thick, and the other soda lime silica glass substrate 3 is clear and from 2 to 3.2 mm thick). In Table 1 below, $R_gY$ is visible reflection from the outside or exterior of the window/building (i.e., from where the sun is located, and $R_fY$ is visible reflection from the interior side (e.g., from within the building interior), and the a*, b* values under these respective reflection parameters also correspond to glass (g) side (i.e., from outside the window in FIGS. 1–2) and film (f) side (i.e., from interior the window in FIGS. 1–2).

TABLE 1

IG Unit Solar Characteristics

| Characteristic | General | Preferred | More Preferred |
|---|---|---|---|
| $T_{vis}$ (or TY)(Ill. C, 2 deg.): | >=60% | >=68% | >=70% |
| $a*_t$ (Ill. C, 2°): | −10 to 10 | −5.0 to 0.0 | −3.5 to −1.5 |
| $b*_t$ (Ill. C, 2°): | −10 to 10 | −2.0 to 4.0 | 1.0 to 3.0 |
| $R_gY$ (Ill. C, 2 deg.): | 5 to 17% | 7 to 13% | 9 to 11% |
| $a*_g$ (Ill. C, 2°): | −8.0 to 8.0 | −3.0 to 2.0 | −2.0 to 0.5 |
| $b*_g$ (Ill. C, 2°): | −8.0 to 8.0 | −5.0 to 1.0 | −4.0 to −1.0 |
| $R_fY$ (Ill. C, 2 deg.): | 5 to 20% | 7 to 14% | 10 to 12% |
| $a*_f$ (Ill. C, 2°): | −8.0 to 8.0 | −3.0 to 2.0 | −1.5 to 0.5 |
| $b*_f$ (Ill. C, 2°): | −8.0 to 8.0 | −5.0 to 1.0 | −4.0 to −1.5 |
| SHGC: | <=0.50 | <=0.45 | <=0.40 |
| SC: | <=0.55 | <=0.49 | <=0.46 |
| U-value: | 0.10 to 0.40 | 0.20 to 0.30 | 0.22 to 0.25 |
| $T_{ultraviolet}$: | <=0.25 | <=0.15 | <=0.05 |
| $T_{UV\ damage\ weighted}$: | <=0.30 | <=0.20 | <=0.10 |

It is noted that certain parameters can be tuned by adjusting layer thicknesses. For example, ultraviolet (UV) transmission ($T_{ultraviolet}$) can be reduced further by adjusting dielectric thickness(es).

In certain embodiments of this invention, IG window units block at least about 80% of UV radiation at 300–380 nm thereby preventing the same from reaching the building interior (more preferably block at least about 90% of UV radiation at 300–380 nm, even more preferably block at least about 95% of UV radiation at 300–380 nm, and most preferably block at least about 97% of UV radiation at 300–380 nm thereby preventing the same from reaching the building interior). In other words, IG window units according to certain embodiments of this invention have a UV transmission from 300–380 nm of no greater than about 20%, more preferably no greater than about 10%, even more preferably no greater than about 5%, and most preferably no greater than about 3%.

Figure 3:
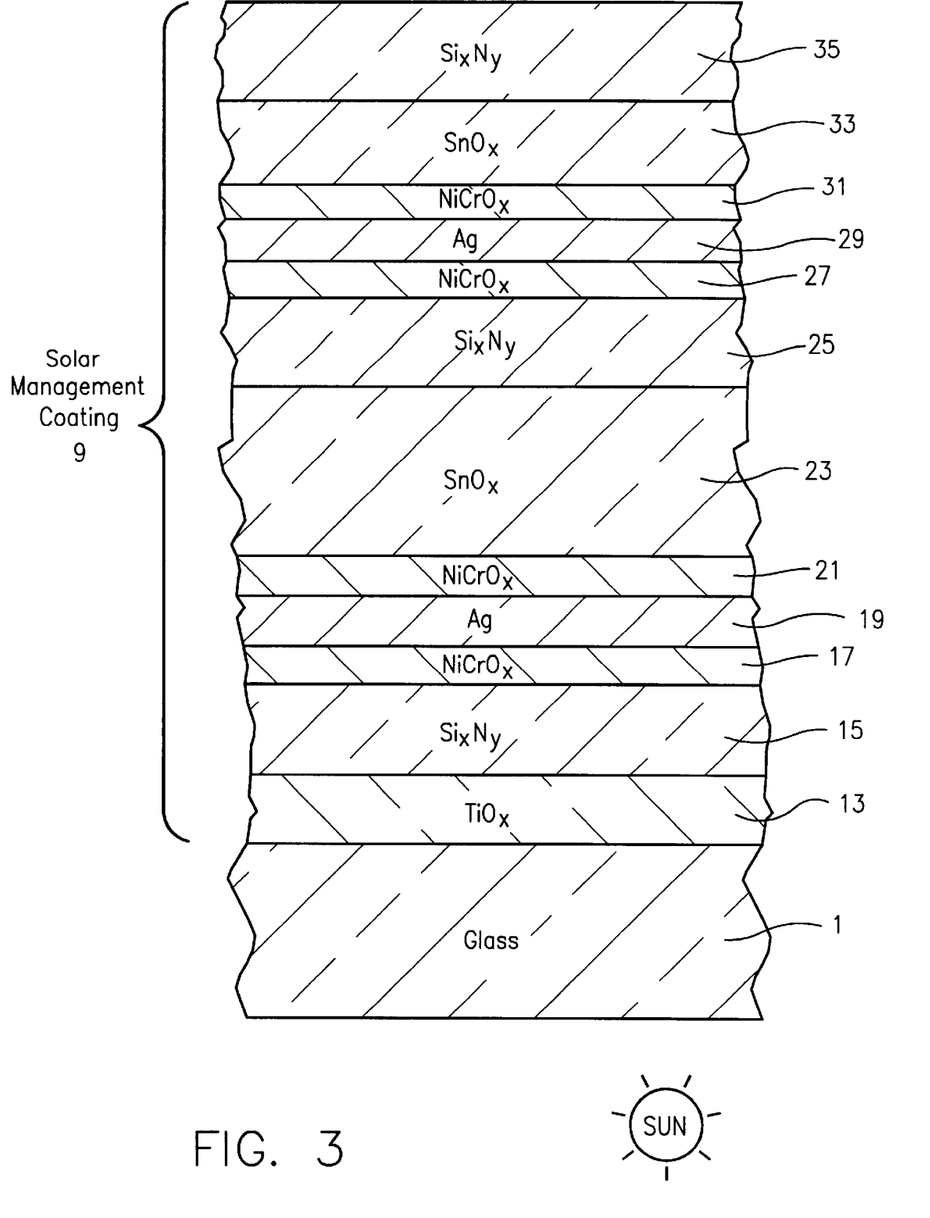
FIG. 3 is a cross sectional view of an example solar management coating that may be provided on one of the substrates of the IG window unit of FIG. 1 and/or FIG. 2.

FIG. 3 is a side cross sectional view of an example solar management coating 9 that may be provided on substrate 1 in certain example embodiments of this invention. Substrate 1 may be, for example and without limitation, clear, green, bronze, or blue-green glass from about 1.0 to 10.0 mm thick, more preferably from about 1.8 mm to 4 mm thick). The solar management coating 9 in this example embodiment includes first dielectric layer 13, second dielectric haze-reducing layer 15, first lower contact layer 17 (which contacts layer 19), first conductive infrared (IR) blocking layer 19, first upper contact layer 21 (which contacts layer 19), third dielectric layer 23, fourth dielectric layer 25, second lower contact layer 27 (which contacts layer 29), second conductive IR blocking layer 29, second upper contact layer 31 (which contacts layer 29), fifth dielectric layer 33, and finally sixth protective dielectric layer 35. The optional "contact" layers each contact at least one IR blocking layer. The aforesaid layers 13–35 make up heat treatable low-E (i.e., low emissivity) solar management coating 9.

In certain embodiments of this invention, first dielectric layer 13 may be of or include titanium oxide ($TiO_x$ where x is from 1.7 to 2.3, most preferably 2.0), silicon nitride ($Si_xN_y$ where x/y may be about 0.75 (i.e., $Si_3N_4$), or alternatively x/y may be from about 0.76 to 1.5 in Si-rich embodiments), silicon oxide ($SiO_x$ where x is from 1.7 to 2.3, most preferably about 2.0), niobium oxide (e.g., $Nb_2O_5$), SiZrN, tin oxide, zinc oxide, silicon oxynitride, or any other suitable dielectric material. First dielectric layer 13 may function as an antireflection layer in certain embodiments of this invention. Second dielectric layer 15 may function to reduce haze in certain embodiments of this invention, and may be of or include silicon nitride (e.g., $Si_3N_4$, or alternatively silicon-rich silicon nitride $Si_xN_y$ where x/y is from 0.76 to 1.5, more preferably from 0.85 to 1.2). When sputtering silicon nitride layer(s) herein, a Si target may be used, or alternative a target including Si admixed with up to 3–20% by weight aluminum and/or stainless steel (e.g. SS#316) may be used, with about this amount of aluminum and/or steel then appearing in the layer(s) so formed. Other materials may also be used for haze reducing layer 15, including but not limited to SiZrN. While $Si_3N_4$ may be used for layer 15 (and/or layer 35) in certain embodiments, it has been found that a silicon rich type of silicon nitride as layer 15 (and/or layer 25) is better at reducing haze and/or improving mechanical durability in certain embodiments of this invention. In Si-rich silicon nitride embodiments, layer 15 (and/or layer 25) is of or includes $Si_xN_y$ where x/y is from 0.76 to 1.5, more preferably from about 0.85 to 1.2. $Si_3N_4$ has an index of refraction "n" of about 2.04, and an extinction coefficient "k" of about 0. However, Si-rich silicon nitride according to certain embodiments of this invention may have an index of refraction of from 2.0 to 2.3, e.g., at least about 2.05, more preferably of at least about 2.07, and may be 2.08 (at 632 nm) in exemplary embodiments. Also, Si-rich silicon nitride according to certain embodiments of this invention may have an extinction coefficient "k" of from 0.008 to 0.02, e.g., in certain instances at least about 0.001, and more preferably of at least about 0.003. Si-rich silicon nitride, in addition to being better at reducing haze than $Si_3N_4$, has also been found to adhere better to the titanium oxide in example embodiments. Surprisingly, it has also been found that Si-rich silicon nitride under the $NiCrO_x$ and Ag layers provides lower sheet resistance ($R_s$).

Infrared (IR) blocking layers 19 and 29 are metallic and/or conductive in certain example embodiments, and may be made of or include silver (Ag), gold (Au), or any other suitable IR blocking material. These IR blocking layers help enable coating 27 to have low-E characteristics. Other example IR blocking materials include for example and without limitation, NiCr and $NiCrN_x$. Contact layers 17, 21, 27, and 31 are of or include nickel (Ni) oxide, or a nickel alloy oxide such as nickel chrome oxide ($NiCrO_x$), in certain example embodiments of this invention. $NiCrO_x$ layers 17, 21, 27, and/or 31 may be fully oxidized in certain embodiments of this invention (i.e., fully stoichiometric), or may be at least about 75% oxidized in other embodiments of this invention. Those skilled in the art will recognize that other materials may instead be used (e.g., oxides of Ni, oxides of Ni alloys, oxides of Cr, oxides of Cr alloys, $NiCrO_xN_y$, or any other suitable material) for one or more of these contact layers. It is noted that contact layers 17, 21, 27 and/or 31 may or may not be continuous in different embodiments of this invention. One or more of contact layers 17, 21, 27, and/or 31 may be oxidation graded in certain embodiments of this invention so that the degree of oxidation in the layer(s) changes throughout the thickness of the layer(s). For example, one or more of the contact layers may be graded so as to be less oxidized at the contact interface with the immediately adjacent IR blocking layer (19 or 29) than at a portion of the contact layer(s) further or more/most distant from the immediately adjacent IR blocking layer. It is believed that oxidation grading of one or more of contact layer(s) 17, 21, 27 and/or 31 enables the low-E solar management coating 9 to efficiently achieve the combination of heat treatability and high visible transmission.

Still referring to FIG. 3, third dielectric layer 23 acts as a coupling layer between the two halves of the coating 9, and may be of or include tin oxide in certain embodiments of this invention. However, other dielectric materials may instead be used for layer 23, including but not limited to silicon nitride, titanium oxide, niobium oxide, silicon oxynitride, zinc oxide, or the like. Fourth dielectric layer 25 may function as a haze reducer in certain embodiments of this invention, and is preferably of or includes silicon nitride (e.g., $Si_3N_4$, or alternatively silicon-rich silicon nitride discussed above). However, in alternative embodiments of this invention, other materials (e.g., SiZrN) may instead be used for dielectric layer 25. Fifth dielectric layer 33 may be of or include tin oxide in certain embodiments of this invention. However, other dielectric materials may instead be used for layer 33, including but not limited to silicon nitride, titanium oxide, niobium oxide, silicon oxynitride, zinc oxide, or the like. Protective overcoat dielectric layer 35 may be provided at least for durability purposes, and may be of or include silicon nitride (e.g., $Si_3N_4$) in certain embodiments of this invention. However, other dielectric materials may instead be used for layer 35, including but not limited to titanium oxide, silicon oxynitride, tin oxide, zinc oxide, niobium oxide, SiZrN, or the like.

Other layer(s) below or above the illustrated coating 9 May also be provided on substrate 1. Thus, while the coating 9 is "on" or "supported by" substrate 1 (directly or indirectly), other layer(s) may be provided therebetween. Thus, for example, coating 9 of FIGS. 1–3 may be considered "on" and "supported by" the substrate 1 even if other layer(s) are provided between layer 13 and substrate 1. Moreover, certain layers of coating 9 may be removed in certain embodiments, while others may be added in other embodiments of this invention without departing from the overall spirit of certain embodiments of this invention.

Referring to FIG. 3, while various thicknesses may be used consistent with one or more of the embodiments discussed herein, exemplary preferred thicknesses and example materials for the respective layers on the glass substrate 1 in the FIG. 3 embodiment are as follows, the layers being listed proceeding from the substrate 1 outwardly:

TABLE 2

(Example Materials/Thicknesses; FIG. 3 coating)

| Layer | Preferred Range (Å) | More Preferred Range (Å) | Example (Å) |
| --- | --- | --- | --- |
| $TiO_2$ (layer 13) | 0–400 Å | 50–250 Å | 100 Å |
| $Si_xN_y$ (layer 15) | 0–400 Å | 50–250 Å | 170 Å |
| $NiCrO_x$ (layer 17) | 5–100 Å | 10–50 Å | 18 Å |
| Ag (layer 19) | 50–250 Å | 80–120 Å | 105 Å |
| $NiCrO_x$ (layer 21) | 5–100 Å | 10–50 Å | 16 Å |
| $SnO_2$ (layer 23) | 0–800 Å | 500–850 Å | 650 Å |
| $Si_xN_y$ (layer 25) | 0–800 Å | 50–250 Å | 170 Å |
| $NiCrO_x$ (layer 27) | 5–100 Å | 10–50 Å | 18 Å |
| Ag (layer 29) | 50–250 Å | 80–120 Å | 105 Å |
| $NiCrO_x$ (layer 31) | 5–100 Å | 10–50 Å | 16 Å |
| $SnO_2$ (layer 33) | 0–500 Å | 100–300 Å | 150 Å |
| $Si_3N_4$ (layer 35) | 0–500 Å | 100–300 Å | 250 Å |

The solar management coating 9 of the FIG. 3 embodiment may be a low-E coating in certain embodiments of this invention. In certain example embodiments, after heat treatment (e.g., thermal tempering and/or heat bending), the coating 9 in the FIG. 3 embodiment may have a sheet resistance ($R_s$) of no greater than 8 ohms/square, more preferably no greater than 6 ohms/square, and most preferably no greater than 4 ohms/square. In certain embodiments, the coating 9 in the FIG. 3 embodiment may have an emissivity ($E_n$) after heat treatment of no greater than 0.10, more preferably no greater than 0.07, and even more preferably no greater than 0.05.

Figure 4:
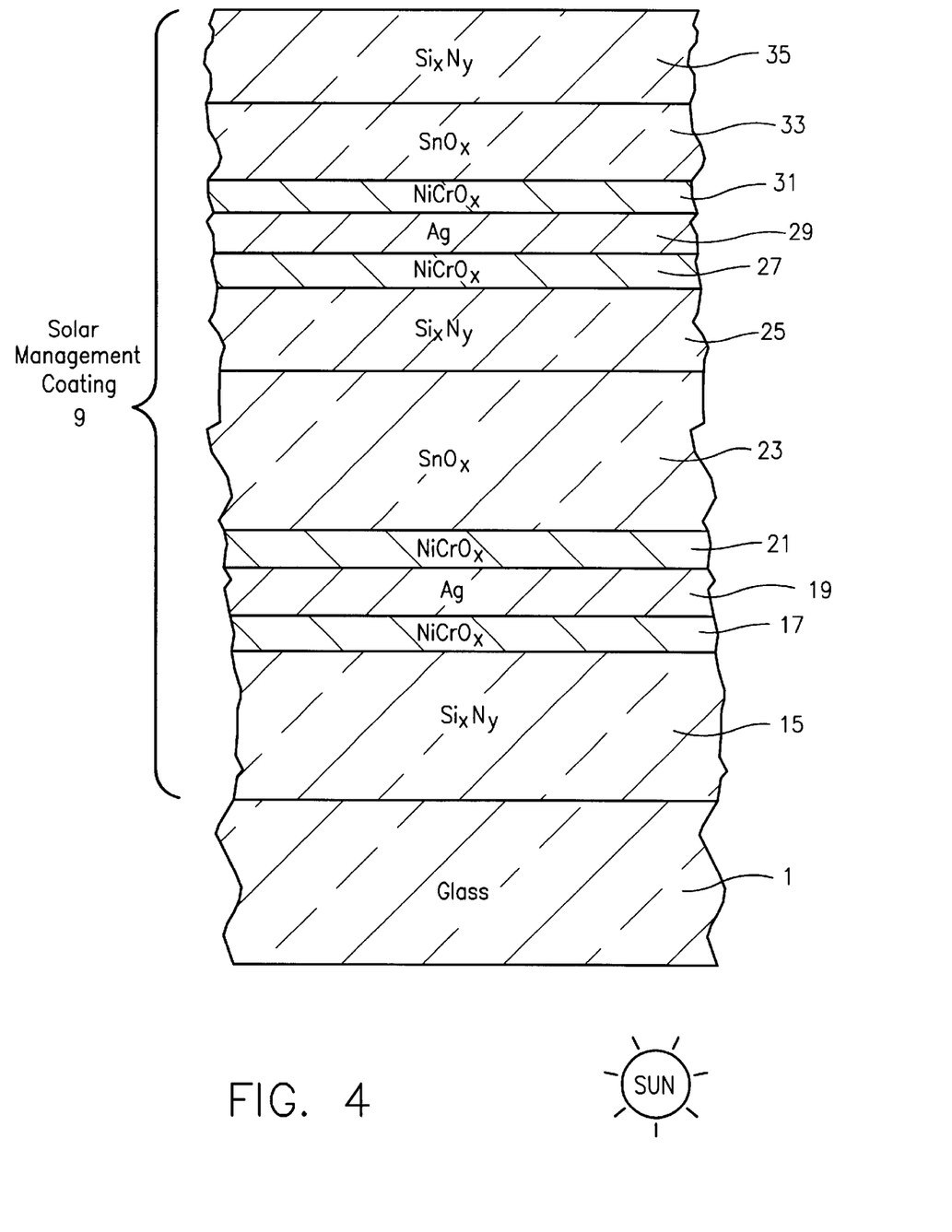
FIG. 4 is a cross sectional view of another example solar management coating that may be provided on one of the substrates of the IG window unit of FIG. 1 and/or FIG. 2.

FIG. 4 illustrates another example low-E solar management coating 9 that may be used in certain embodiments of this invention. The solar management coating 9 of FIG. 4 is the same as that of FIG. 3, except that dielectric layer 13 has been eliminated and optionally layer 15 thickened.

Further details of the solar management coatings 9 of the FIG. 3 and FIG. 4 embodiments may be found in U.S. Ser. No. 09/794,224, now U.S. Pat. No. 6576349 filed Feb. 28, 2001 (see also counterpart WO 02/04375), which are incorporated herein by reference.

Figure 5:
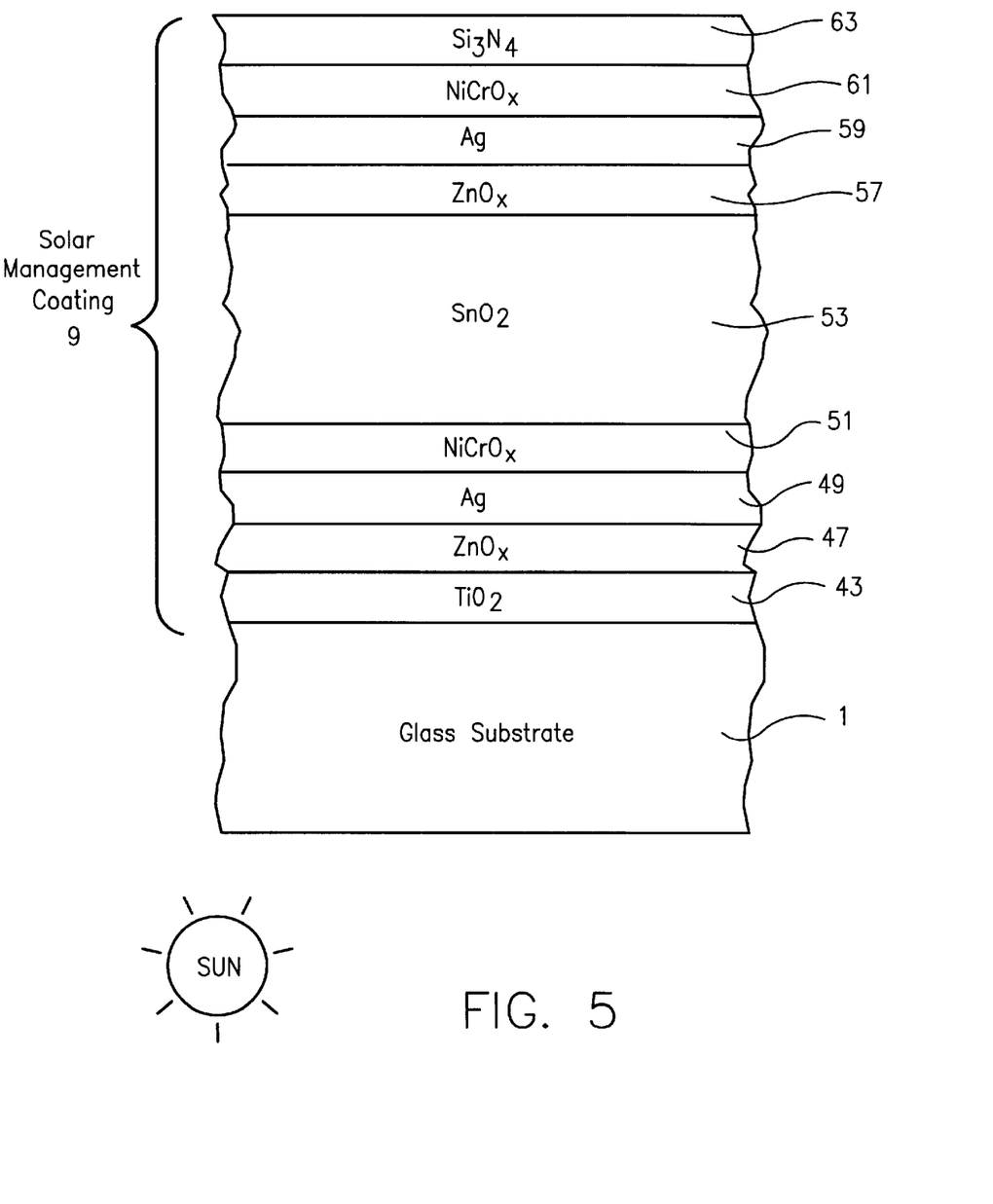
FIG. 5 is a cross sectional view of yet another example solar management coating that may be provided on one of the substrates of the IG window unit of FIG. 1 and/or FIG. 2.

FIG. 5 illustrates another example solar management coating 9 that may be used in certain example embodiments of this invention. The coating 9 of FIG. 5 is not adapted to be heat treated. The solar management coating of FIG. 5 includes first dielectric layer 43, first lower contact layer 47 (which contacts layer 49), first conductive and/or metallic infrared (IR) blocking layer 49, first upper contact layer 51 (which contacts layer 49), second dielectric layer 53, second lower contact layer 57 (which contacts layer 59), second IR blocking layer 59, second upper contact layer 61 (which contacts layer 59), and third dielectric layer 63.

In certain embodiments of this invention, first dielectric layer 43 may be of or include titanium oxide (e.g., $TiO_x$ where x is from 1.7 to 2.3, most preferably x is about 2.0). However, in other embodiments, layer 43 may be of or include silicon nitride ($Si_xN_y$ where x/y may be about 0.75 (i.e., $Si_3N_4$), or alternatively x/y may be from about 0.76 to 1.5 in Si-rich embodiments), aluminum oxide, tin oxide, zinc oxide, $BiO_x$, SiZrN, or any other suitable dielectric material. First dielectric layer 43 may have an index of refraction "n" of at least 1.7, and preferably from 2.0 to 2.7, and most preferably from 2.2 to 2.6. Infrared (IR) blocking layers 49 and 59 are similar to those discussed above regarding the FIG. 3–4 embodiments. The upper contact layers 51 and 61 (i.e., "upper" means the contact layers on top of the respective IR blocking layers 49, 59) may be of or include nickel (Ni) oxide, chromium/chrome (Cr) oxide, or a nickel alloy oxide such as nickel chrome oxide ($NiCrO_x$), in certain example embodiments of this invention, although other materials may instead be used. The upper contact layers 51 and/or 61 may or may not be oxidation graded in different embodiments of this invention. It is noted that upper contact layers 51 and/or 61 may or may not be continuous in different embodiments of this invention, depending upon their respective thickness(es). The lower contact layers 47 and 57 ("lower" means the contact layers on the underneath side of the IR blocking layers 49, 59) may be of or include zinc oxide (e.g., $ZnO_x$, where x if from 0.6 to 1.2 in different embodiments, more preferably x is from 0.7 to 1.0) in certain example embodiments of this invention, although other materials may be used instead including but not limited to $ZnAlO_x$, where x is set to a value such that the % Al (by weight) in the layer is from about 0–15%, more preferably from about 0–6%, and most preferably from about 1–4%. In certain example embodiments of this invention, layer(s) 47 and/or 57 may have an index of refraction of from 1.8 to 2.2, more preferably from about 1.9 to 2.1. Surprisingly, it has been found that by using $ZnO_x$, $ZnAlO_x$, or the like for the lower contact layer(s) 47 and/or 57, while using $NiCrO_x$ of the like for the upper contact layer(s) 51 and/or 61, the resulting coated article can achieve a combination of high visible transmission and reduced sheet resistance $R_s$, as well as acceptable durability (mechanical and/or chemical). The highly durable $NiCrO_x$ is used for the upper contact layers 51 and/or 61 for durability purposes, while the solar controlling $ZnO_x$, $ZnAlO_x$, or the like is used for the lower contact layer(s) 47 and/or 57 to improve visible transmission and/or other solar characteristics. In other words, the $NiCrO_x$ provides good durability, especially when on top of the Ag layers, and the zinc oxide inclusive contact layer(s) enable high visible transmission to be combined with low sheet resistance $R_s$ and/or good solar performance. Other materials may of course be used.

Still referring to FIG. 5, second dielectric layer 53 acts as a coupling layer between the two halves of the coating 9, and is of or includes tin oxide (e.g., $SnO_2$ or some non-stoichiometric form thereof) in certain embodiments of this invention. However, other dielectric materials may instead be used for layer 53, including but not limited to silicon nitride, titanium oxide, niobium oxide, silicon oxynitride, zinc oxide, or the like. Third dielectric layer 63 enables the environmental resistance of the coating to be improved, and may also be provided for color purposes. In certain example embodiments, dielectric layer 63 may be of or include silicon nitride, although other materials may instead be used including but not limited to titanium oxide, silicon oxynitride, tin oxide, zinc oxide, niobium oxide, or the like.

Figure 6:
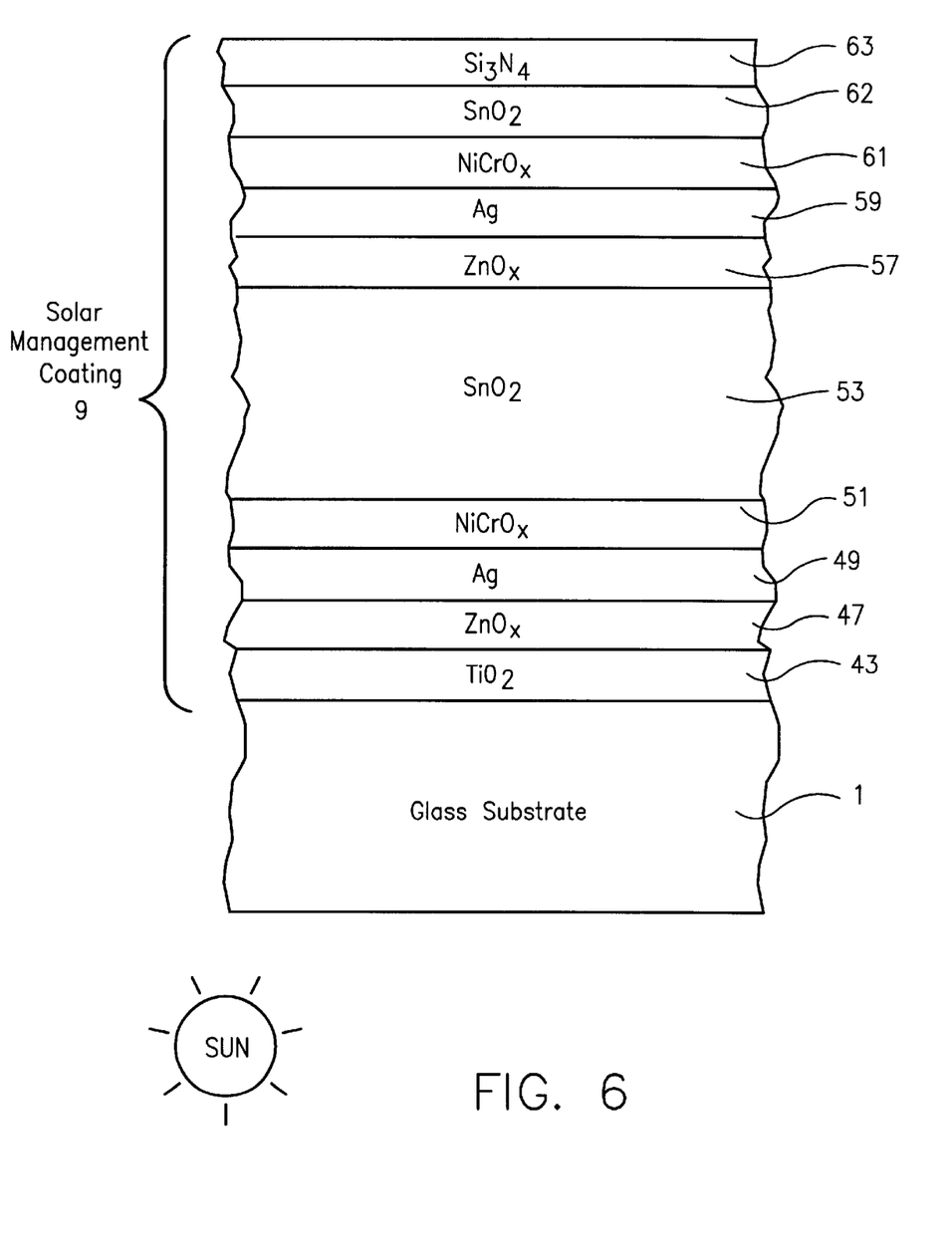
FIG. 6 is a cross sectional view of still another example solar management coating that may be provided on one of the substrates of the IG window unit of FIG. 1 and/or FIG. 2.

FIG. 6 illustrates another non-heat treated solar management coating 9 that may be used in certain example embodiments of this invention. The coating 9 of FIG. 6 is similar to that of FIG. 5, except for the addition of dielectric layer 62 which may be of or include a material such as tin oxide, silicon nitride, titanium oxide, silicon oxynitride, zinc oxide, niobium oxide, or the like.

Referring to FIGS. 5–6, while various thicknesses may be used consistent with one or more of the embodiments discussed herein, exemplary thicknesses and example materials for the respective layers on the glass substrate 1 in the FIGS. 5–6 embodiment are as follows:

TABLE 3

(Example Materials/Thicknesses; FIGS. 5–6 Embodiment)

| Layer | Preferred Range (Å) | More Preferred Range (Å) | Example (Å) |
|---|---|---|---|
| $TiO_2$ (layer 43) | 0–700 Å | 100–400 Å | 200 Å |
| $ZnO_x$ (layer 47) | 25–200 Å | 40–150 Å | 90 Å |
| Ag (layer 49) | 50–250 Å | 80–120 Å | 130 Å |
| $NiCrO_x$ (layer 51) | 5–100 Å | 15–60 Å | 30 Å |
| $SnO_2$ (layer 53) | 0–1,000 Å | 500–900 Å | 680 Å |
| $ZnO_x$ (layer 57) | 25–200 Å | 40–150 Å | 90 Å |
| Ag (layer 59) | 50–250 Å | 80–220 Å | 168 Å |
| $NiCrO_x$ (layer 61) | 5–100 Å | 15–60 Å | 30 Å |
| $SnO_2$ (layer 62) | 0–500 Å | 70–200 Å | 125 Å |
| $Si_3N_4$ (layer 63) | 0–500 Å | 120–320 Å | 220 Å |

In certain exemplary embodiments of this invention, coatings 9 according to the FIG. 5–6 embodiments may have the following low-E characteristics set forth in Table 4. It is noted that in Table 4 the term $E_n$ means normal emissivity/emittance.

TABLE 4

Low-E Characteristics (FIGS. 5–6 embodiments)

| Characteristic | General | More Preferred | Most Preferred |
|---|---|---|---|
| $R_s$ (ohms/sq.): | <=8.0 | <=5.0 | <=3.0 |
| $E_n$: | <=0.10 | <=0.07 | <=0.03 |

Further details concerning the solar management coatings 9 of the FIG. 5–6 embodiments may be found in U.S. Ser. No. 09/978,184 pending, filed Oct. 17, 2001, the disclosure of which is hereby incorporated herein by reference.

It is also noted that other solar management coatings 9 may instead be used. For example and without limitation, the solar management coatings described and/or illustrated in any of U.S. Pat. Nos. 5,800,933, 5,837,108, 5,557,462, 6,014,872, 5,514,476, 5,935,702, 4,965,121, 5,563,734, 6,030,671, 4,898,790, 5,902,505, 3,682,528, or WO 01/66482, or WO 01/66483, may instead be used for coating 9.

The materials, specific layers, and thicknesses for the coatings discussed above are for example only and are not intended to be limiting unless specifically claimed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An IG window unit comprising:
    a first glass substrate supporting a solar management multi-layer coating;
    a second glass substrate spaced apart from the first glass substrate, the second glass substrate supporting a UV blocking coating including at least one layer;
    wherein the solar management coating supported by the first glass substrate comprises first and second IR blocking layers each comprising Ag, at least one dielectric layer provided between the first IR blocking layer and the first substrate, at least another dielectric layer provided between the first and second IR blocking layers, and wherein the solar management coating supported by the first substrate has an emissivity ($E_n$) of no greater than 0.10 and/or a sheet resistance ($R_s$) of no greater than 8 ohms/square;
    wherein the UV blocking coating supported by the second substrate blocks at least 50% of UV radiation from 300 to 380 nm; and
    wherein the IG window unit has a visible transmission of at least about 60%, and blocks at least about 80% of UV radiation from 300–380 nm.

2. The IG window unit of claim 1, wherein the IG window unit blocks at least about 90% of UV radiation from 300–380 nm.

3. The IG window unit of claim 1, wherein the IG window unit blocks at least about 95% of UV radiation from 300–380 nm, and wherein the solar management coating and the UV blocking coating are on respective sides of the respective substrates so as to face one another across a space defined between the substrates.

4. The IG window unit of claim 1, wherein the IG window unit blocks at least about 97% of UV radiation from 300–380 nm.

5. The IG window unit of claim 1, wherein the first and second glass substrates are spaced apart from one another by at least one spacer and/or edge seal so as to define a space between the substrates.

6. The IG window unit of claim 5, wherein the space between the substrates is filled with a gas and/or is evacuated to a pressure less than atmospheric.

7. The IG window unit of claim 1, wherein the IG window unit has a visible transmission of at least 70%.

8. The IG window unit of claim 1, wherein the dielectric layer provided between the first IR blocking layer and the first substrate comprises at least one of silicon nitride and titanium oxide.

9. The IG window unit of claim 1, wherein the another dielectric layer provided between the first and second IR blocking layers comprises at least one of tin oxide, zinc oxide, and silicon nitride.

10. The IG window unit of claim 1, wherein the solar management coating supported by the first substrate has an emissivity ($E_n$) of no greater than 0.07 and a sheet resistance ($R_s$) of no greater than 5 ohms/square.

11. The IG window unit of claim 1, wherein the solar management coating supported by the first substrate comprises at least one contact layer comprising $NiCrO_x$ that contacts the first IR blocking layer comprising Ag.

12. A window unit comprising:
    a first substrate supporting a solar management coating;
    a second substrate spaced apart from the first substrate, the second glass substrate supporting a UV blocking coating;
    wherein the solar management coating supported by the first substrate comprises at least one IR blocking layer, at least one dielectric layer provided between the IR blocking layer and the first substrate, at least another dielectric layer provided over the IR blocking layer; and
    wherein the window unit has a visible transmission of at least about 60%, and blocks at least about 80% of UV radiation from 300–380 nm.

13. The window unit of claim 12, wherein the solar management coating supported by the first substrate has an emissivity ($E_n$) of no greater than 0.10 and/or a sheet resistance ($R_s$) of no greater than 8 ohms/square, and wherein the IR blocking layer comprises at least one of Ag, Au and Ni.

14. The window unit of claim 12, wherein the solar management coating comprises another IR blocking layer comprising at least one of Ag, Au and Ni, and where the another dielectric layer is provided between the first and second IR blocking layers.

15. The window unit of claim 14, wherein the IR blocking layers each comprise Ag.

16. The window unit of claim 12, wherein the window unit blocks at least about 95% of UV radiation from 300–380 nm.

17. The window unit of claim 12, wherein the solar management coating supported by the first substrate has an emissivity ($E_n$) of no greater than 0.07 and a sheet resistance ($R_s$) of no greater than 5 ohms/square.

18. The window unit of claim 12, wherein the window unit has a visible transmission of at least 70%.

19. The window unit of claim 12, wherein each of the solar management coating and the UV blocking coating are on surfaces of the respective substrates so that the respective coatings face one another across a space provided between the substrates.

20. A window unit comprising:

a first substrate supporting a coating;

a second substrate spaced apart from the first substrate, the second glass substrate supporting a UV blocking coating;

wherein the coating supported by the first substrate has an emissivity ($E_n$) of no greater than 0.20 and/or a sheet resistance ($R_s$) of no greater than 20 ohms/square; and wherein the window unit has a visible transmission of at least about 60%, and blocks at least about 80% of UV radiation from 300–380 nm.

21. The window unit of claim 20, wherein the coating supported by the first substrate comprises first and second IR blocking layers comprising Ag that are spaced apart from one another with at least one dielectric layer provided therebetween.

22. A method of making a window unit, the method comprising:

depositing a solar management coating on a first substrate, the solar management coating comprising at least one layer for blocking at least some IR radiation;

forming a UV blocking coating that blocks at least some UV radiation on a second substrate; and coupling the first and second substrates to one another so that the respective coatings face each other across a gap provided between the substrates, and wherein the window unit has a visible transmission of at least 60% and blocks at least about 80% of UV radiation from 300–380 nm.

23. The IG window unit of claim 1, further comprising a layer comprising diamond-like carbon (DLC) supported by at least one of the first and second substrates.

24. The IG window unit of claim 23, wherein the layer comprising DLC includes more $sp^3$ carbon-carbon bonds than $sp^2$ carbon-carbon bonds, and has an average hardness of at least 10 GPa.

25. The window unit of claim 12, further comprising a layer comprising diamond-like carbon (DLC) supported by at least one of the first and second substrates.

26. The window unit of claim 25, wherein the layer comprising DLC includes more $sp^3$ carbon-carbon bonds than $sp^2$ carbon-carbon bonds, and has an average hardness of at least 10 GPa.

27. The window unit of claim 26, wherein the layer comprising DLC is supported by the first substrate and is provided on a major surface of the first substrate opposite the solar management coating.

28. The window unit of claim 20, further comprising a layer comprising diamond-like carbon (DLC) supported by the first substrate.

29. The window unit of claim 28, wherein the layer comprising DLC includes more $sp^3$ carbon-carbon bonds than $sp^2$ carbon-carbon bonds, and has an average hardness of at least 10 GPa.

30. The window unit of claim 29, wherein the layer comprising DLC is provided on a major surface of the first substrate opposite the solar management coating.

\* \* \* \* \*